US009338397B2

(12) United States Patent
Kitazawa

(10) Patent No.: US 9,338,397 B2
(45) Date of Patent: May 10, 2016

(54) INFORMATION PROCESSING DEVICE AND CONFERENCE SYSTEM

(71) Applicant: Kazuki Kitazawa, Kanagawa (JP)

(72) Inventor: Kazuki Kitazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/644,626

(22) Filed: Mar. 11, 2015

(65) Prior Publication Data

US 2015/0264315 A1    Sep. 17, 2015

(30) Foreign Application Priority Data

Mar. 12, 2014  (JP) ................................. 2014-048966
Dec. 25, 2014  (JP) ................................. 2014-261638

(51) Int. Cl.
*H04N 7/14*  (2006.01)
*H04N 7/15*  (2006.01)

(52) U.S. Cl.
CPC ...................................... *H04N 7/15* (2013.01)

(58) Field of Classification Search
CPC ....................................................... H04N 7/14
USPC ................... 348/14.01, 14.08, 14.12
See application file for complete search history.

(56) References Cited

U.S. PATENT DOCUMENTS

| | | | |
|---|---|---|---|
| 8,842,155 B2 * | 9/2014 | Border | G06K 9/00228 348/14.01 |
| 9,007,425 B1 * | 4/2015 | Simon | H04N 7/18 348/14.05 |
| 9,065,967 B2 * | 6/2015 | Hubner | H04N 7/142 |
| 9,124,764 B2 * | 9/2015 | Zhao | H04N 7/15 |
| 2008/0218585 A1 * | 9/2008 | Wagner | H04N 5/262 348/14.09 |
| 2012/0320144 A1 * | 12/2012 | Samadani | 348/14.08 |
| 2013/0063537 A1 | 3/2013 | Emori | |
| 2014/0078244 A1 | 3/2014 | Kitazawa et al. | |
| 2014/0267541 A1 * | 9/2014 | Atkinson | H04N 7/141 348/14.01 |
| 2015/0092013 A1 * | 4/2015 | Noisette | H04N 7/152 348/14.09 |

FOREIGN PATENT DOCUMENTS

| | | |
|---|---|---|
| JP | 2012-138823 | 7/2012 |
| JP | 2013-016933 | 1/2013 |
| JP | 2013-078105 | 4/2013 |

OTHER PUBLICATIONS

U.S. Appl. No. 14/644,626, filed Mar. 11, 2015, Kitazawa.
U.S. Appl. No. 14/022,772, filed Sep. 10, 2013.

* cited by examiner

*Primary Examiner* — Olisa Anwah
(74) *Attorney, Agent, or Firm* — Oblon, McClelland, Maier & Neustadt, L.L.P.

(57) ABSTRACT

An information processing device includes an imaging unit configured to take an image; a first image processing unit configured to perform a first image process on the taken image; a sending unit configured to send the image, which has undergone the first image process, to a device that is a communication destination; and a changing unit configured to change a process content of the first image process, according to usage scene information received from the device that is the communication destination, the usage scene information specifying at least one usage scene among a plurality of usage scenes defined in advance.

8 Claims, 14 Drawing Sheets

INFORMATION PROCESSING DEVICE AND CONFERENCE SYSTEM

BACKGROUND OF THE INVENTION

1. Field of the Invention

The present invention relates to an information processing device and a conference system.

2. Description of the Related Art

There is known a TV conference system for holding conferences with remote locations via a communication network such as the Internet. In such a TV conference system, the images and voice sound of participants are acquired by using a TV conference device, and the acquired images and voice sound are sent to a TV conference device of a communication destination. Furthermore, images received from a TV conference device of a communication destination are displayed on a display device such as a display and a projector, and the received voice sound is output from a speaker. Accordingly, participants of the TV conference system are able to hold a conference between remote locations, as if they are attending an actual conference.

There is known a technology of such a TV conference system, in which targets such as the faces of the participants and a white board are extracted from the conference images, and distortion correction is performed to reduce image distortions in the target having the highest priority among the plurality of extracted targets (see, for example, Patent Document 1).

Patent Document 1: Japanese Laid-Open Patent Publication No. 2013-16933

However, TV conferences are held in various usage scenes (usage environments, circumstances, etc.). Examples of a usage environment are a conference room into which light is relatively unlikely to enter, a conference room that is likely to become a backlight environment due to light from outside, a conference room using a projector, and a conference room using a whiteboard. In these different usage environments, for example, as in the technology disclosed in Patent Document 1, by sending images taken by a single parameter (for example, a setting of the brightness) in accordance with a target of a high priority, there may be cases where the conference images are difficult to see depending on the environment.

As described above, in a conference system, it has been difficult to perform an appropriate image process such as adjusting the brightness of an image of the conference, in accordance with the usage scene of the device receiving images of the conference.

SUMMARY OF THE INVENTION

The present invention provides an information processing device and a conference system, in which one or more of the above-described disadvantages are eliminated.

According to an aspect of the present invention, there is provided an information processing device including an imaging unit configured to take an image; a first image processing unit configured to perform a first image process on the taken image; a sending unit configured to send the image, which has undergone the first image process, to a device that is a communication destination; and a changing unit configured to change a process content of the first image process, according to usage scene information received from the device that is the communication destination, the usage scene information specifying at least one usage scene among a plurality of usage scenes defined in advance.

According to an aspect of the present invention, there is provided a conference system including an imaging unit configured to take an image of a conference; an image processing unit configured to perform a first image process on a first image based on the taken image; a sending unit configured to send a second image that has undergone the first image process to a first device participating in the conference; and a changing unit configured to change a process content of the first image process, according to usage scene information received from the first device, the usage scene information specifying a first usage scene among a plurality of usage scenes defined in advance.

According to an aspect of the present invention, there is provided a non-transitory computer-readable recording medium storing a program that causes a computer to execute a process including performing a first image process on an image taken by an imaging unit configured to take an image; sending the image, which has undergone the first image process, to a device that is a communication destination; and changing a process content of the first image process, according to usage scene information received from the device that is the communication destination, the usage scene information specifying at least one usage scene among a plurality of usage scenes defined in advance.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

<System Configuration>

Figure 1:
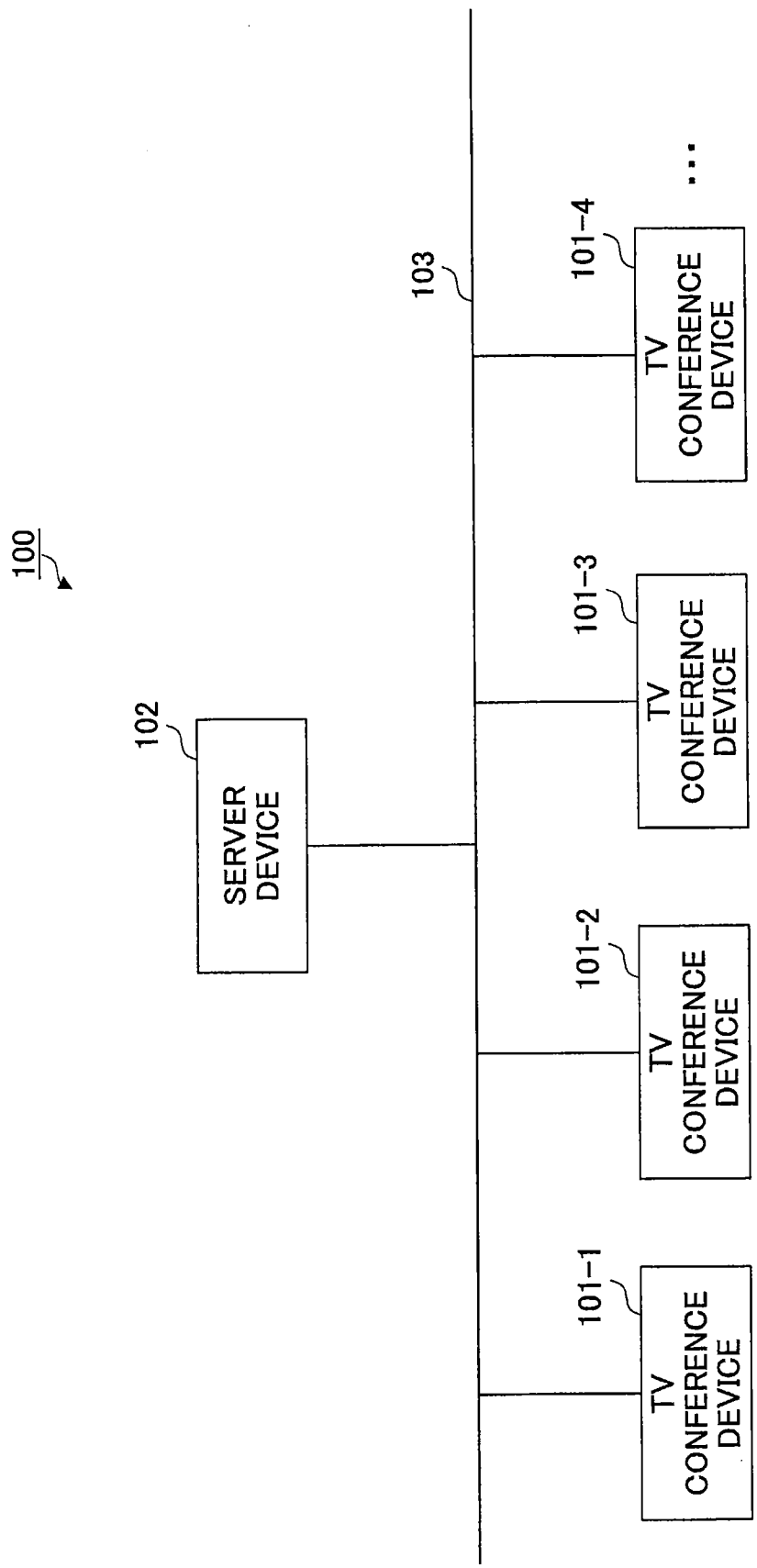
FIG. 1 illustrates a configuration example of a TV conference system, which is a conference system according to an embodiment.

FIG. 1 illustrates a configuration example of a TV conference system, which is a conference system according to an embodiment. A TV conference system (conference system) 100 includes, for example, a plurality of TV conference devices 101-1 through 101-4, and a server device 102, which are connected to a network 103 such as the Internet. Note that in the following description, "TV conference device 101" is used when referring to an arbitrary TV conference device among the plurality of TV conference devices 101-1 through 101-4.

The TV conference device 101 is a terminal device adapted to the TV conference system 100. The TV conference device 101 may be, for example, a general-purpose information processing device such as a PC (personal computer), a tablet terminal, and a smartphone, or an information processing device such as a terminal exclusively used for the TV conference system 100. Note that when the TV conference device 101 is a general-purpose information processing device, the functions of the TV conference device 101 are realized by, for example, an application program installed in the information processing device.

For example, the server device 102 monitors the connection state as to whether connection is made with the TV conference devices 101-1 through 101-4, implements connection control when starting/ending a TV conference, and implements control of transmitting and receiving data such as images (videos) and voice sound during the TV conference. Note that the server device 102 may include the functions of encoding data obtained from the TV conference device 101, and decoding the encoded data obtained from the TV conference device 101.

By the above configuration, the TV conference device 101 is able to perform communication and transmit/receive images and voice sound with other TV conference devices 101, via the server device 102. Accordingly, for example, a user of the TV conference device 101-1 is able to hold a TV conference with users of the other TV conference devices 101-2 through 101-4, via images and voice sound that are transmitted/received in a real-time manner.

Note that the configuration of FIG. 1 is one example. For example, the number of TV conference devices 101 constituting the TV conference system 100 may be an arbitrary number of two or more. Furthermore, the TV conference device 101 may be connected in a peer-to-peer manner with another TV conference device 101 with which communication is to be made, without being mediated by the server device 102. Furthermore, the TV conference system 100 may further include a plurality of the server devices 102.

<Hardware Configuration>

Figure 2:
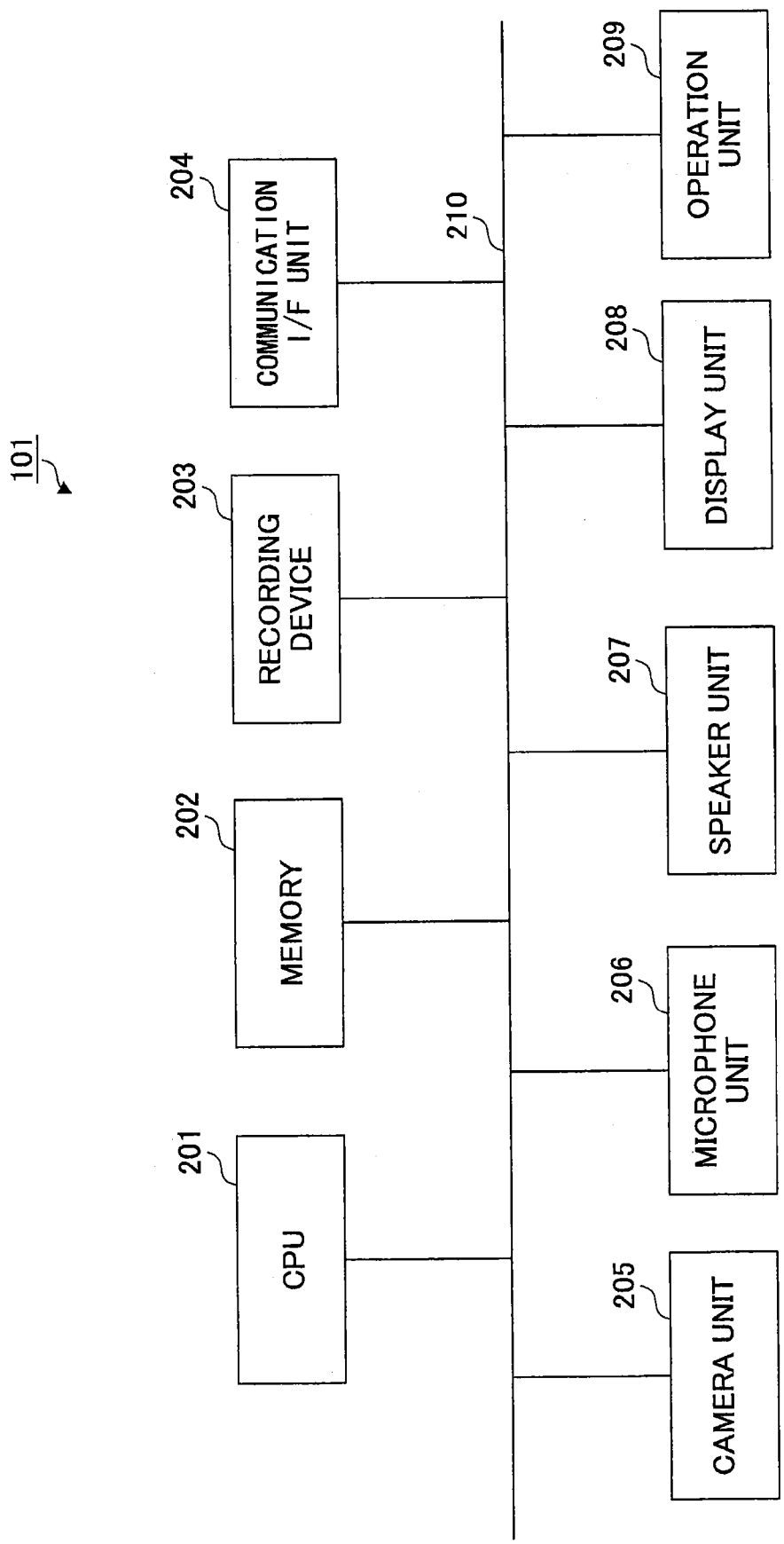
FIG. 2 illustrates a hardware configuration example of the TV conference device 101 according to an embodiment.

FIG. 2 illustrates a hardware configuration example of the TV conference device 101 according to an embodiment. The TV conference device 101 has a configuration of a typical computer, and includes, for example, a CPU (Central Processing Unit) 201, a memory 202, a recording device 203, a communication I/F (interface) unit 204, a camera unit 205, a microphone unit 206, a speaker unit 207, a display unit 208, an operation unit 209, and a bus 210.

The CPU 201 is a processor that reads programs and data from, for example, the recording device 203, and executes processes, to realize the functions of the TV conference device 101. For example, the CPU 201 executes programs of the TV conference device 101 to realize the functions of controlling of the entire TV conference device 101, controlling the TV conference, performing an image process on images that are transmitted and received, and performing voice sound processing on voice sound that is transmitted and received.

The memory 202 includes, for example, storage devices such as a RAM (Random Access Memory) and a ROM (Read Only Memory). The RAM is a volatile memory used as a work area of the CPU 201. The ROM is a non-volatile memory for storing, for example, activation programs and setting values, of the TV conference device 101. The recording device 203 is a storage device recording, for example, programs and data for implementing device control and TV conference control executed by the CPU 201; the recording device 203 is constituted by a HDD (Hard Disk Device), a SSD (Solid State Drive), a flash ROM, etc.

The communication I/F unit 204 is a communication unit for connecting the TV conference device 101 to the network 103, and performing transmission/reception of data with other TV conference devices 101 and the server device 102. The communication I/F unit 204 is constituted by, for example, an interface such as a wired LAN (Local Area network) adapted to 10Base-T, 100Base-TX, and 1000Base-T, and a wireless LAN adapted to IEEE 802.11a/b/g/n.

The camera unit 205 is an imaging unit for taking images of, for example, the participants of the TV conference. The camera unit 205 converts a taken image of a conference into predetermined image data, and sends the image data to the CPU 201 via the bus 210. At this time, for example, the camera unit 205 is able to change the brightness of the taken image based on camera parameters that have been set. For example, the camera unit 205 includes default camera parameters, and the values of the camera parameters may be dynamically changed by programs operating in the CPU 201.

The microphone unit 206 acquires, for example, the voice sound of the conference participants, converts the acquired voice sound into predetermined voice sound data, and sends the voice sound data to the CPU 201 via the bus 210. For example, the microphone unit 206 includes a plurality of directional microphones.

The speaker unit 207 converts, for example, the predetermined voice sound data received from the CPU 201 into voice sound, and outputs the voice sound.

The display unit 208 is a display unit for displaying, for example, image data received from the CPU 201; the display unit 208 is, for example, an LCD (Liquid Crystal Display) or a display device such as a projector.

The operation unit 209 is a unit for the TV conference device 101 to receive operations of the user, such as operation buttons and a keyboard.

The bus 210 is, for example, an address bus and a data bus, and transmits various control signals.

Note that in FIG. 2, the camera unit 205, the microphone unit 206, the speaker unit 207, and the display unit 208 may be external devices having a part that is externally connected to the main body of the TV conference device 101. Alternatively, a display device (display unit 208) connected to the TV conference device 101 may be internally equipped with the camera unit 205, the microphone unit 206, and the speaker unit 207.

<Functional Configuration>

(Functional Configuration of TV Conference System)

Figure 3:
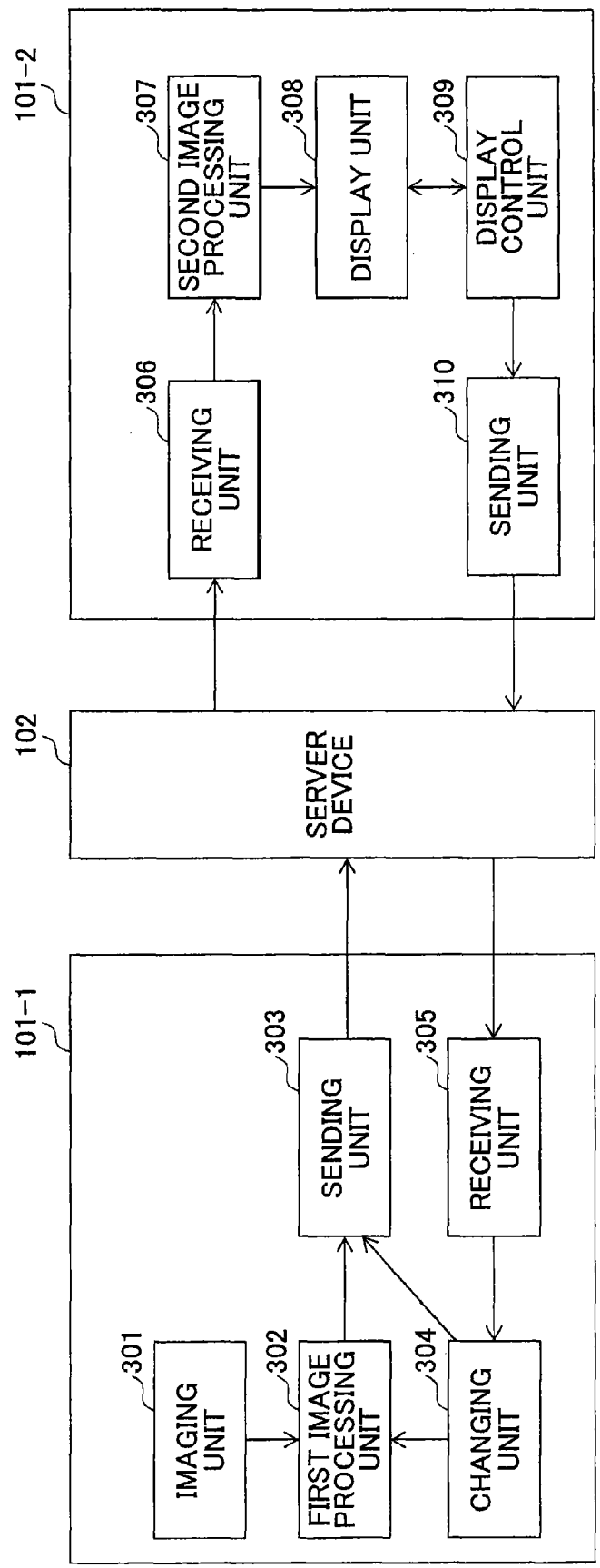
FIG. 3 is a functional configuration diagram of the TV conference system according to an embodiment.

FIG. 3 is a functional configuration diagram of the TV conference system according to an embodiment. FIG. 3 illustrates an example of a functional configuration in which an image is sent from the TV conference device 101-1 to the TV conference device 101-2.

In FIG. 3, the TV conference device 101-1 of the sending side includes an imaging unit 301, a first image processing unit 302, a sending unit 303, a changing unit 304, and a receiving unit 305. Furthermore, the TV conference device 101-2 of the receiving side includes a receiving unit 306, a second image processing unit 307, a display unit 308, a display control unit 309, and a sending unit 310.

The imaging unit 301 is, for example, a means for taking images of the conference, such as a participant of the conference, a whiteboard, and an image projected by a projector. For example, the imaging unit 301 includes the camera unit 205 of FIG. 2 and a control program thereof.

The first image processing unit 302 performs an image process (first image process) on an image taken by the imaging unit 301, such as adjusting the brightness. The first image processing unit 302 is realized by, for example, a program operating in the CPU 201 of FIG. 2. Alternatively, the first image processing unit 302 may be an image processing unit such as a camera DSP (Digital Signal Processor) included in the camera unit 205 of FIG. 2. Note that the image process performed by the first image processing unit 302 includes processes by which the brightness of the image is substantially changed, such as brightness adjustment, contrast adjustment, and gamma adjustment.

The sending unit 303 sends an image (image data) on which an image process has been performed by the first image processing unit 302, to the TV conference device 101-2 that is the communication destination, via the server device 102. Furthermore, the sending unit 303 is able to send information other than image data, such as communication control information, and usage scene information. For example, the sending unit 303 includes the communication I/F unit 204 of FIG. 2, and a control program thereof.

The changing unit 304 changes the process contents of an image process performed in the first image process according to usage scene information that has been received, upon receiving usage scene information specifying at least one usage scene among a plurality of usage scenes defined in advance. For example, the changing unit 304 changes the processing contents of a program functioning as a first image processing unit according to the usage scene information that has been received, and changes the brightness of the taken image. Alternatively, the changing unit 304 may change the camera parameter of the camera unit 205 (for example, a setting value of a camera DSP of the camera unit 205) according to the usage scene information that has been received, and change the brightness, etc., of the taken image. Note that the usage scenes include usage environments such as a conference room environment, a backlight environment, and a projector environment, and usage modes such as the conference is held while viewing the faces of the participants, and a single presenter gives a presentation.

Furthermore, the changing unit 304 changes the process contents of an image process (first image process) of the first image processing unit 302, to processing contents adapted to a plurality of usage scenes, when different types of usage scene information are received from a plurality of TV conference devices 101 that are communication destinations. Furthermore, the changing unit 304 requests the TV conference device 101 that has sent the usage scene information to perform an additional image process (second image process) on the image that has been sent, based on the received usage scene information and the process contents of the first image process.

Here, a description is given of the first image process and the second image process by specific examples.

For example, in a conference using a projector, at one position, attention is focused on an image projected by a projector, and at another position, an image projected by a projector is held as electronic data, and therefore attention is focused on the facial expressions of the participants. In a case where the usage scenes are different in this manner, when the brightness is optimized based on the image projected by the projector, the faces of the people become dark. Furthermore, when the brightness is optimized based on the faces of the people, halation occurs in the image projected by the projector. Thus, it is difficult to adapt to different usage scenes only by the image process (first image process) of the sending side.

Accordingly, the TV conference device 101-1 of the sending side according to the present embodiment performs a common image process for adapting to, for example, two types of usage scene information, by the first image processing unit. Furthermore, according to need, the TV conference device 101-1 requests the TV conference devices 101-2, 101-3 of the receiving side to perform an additional image process (second image process). Accordingly, the TV conference device 101-1 according to the present embodiment is able to perform an appropriate image process on images of the conference to be respectively sent to the TV conference devices 101-2, 101-3 of different usage scenes.

Note that at this time, by performing a common image process adapted to a plurality of types of usage scene information by a first image processing unit at the sending side, it is possible to reduce the load relevant to a second image process, and to reduce halation or black defects in the image to be sent.

The TV conference device 101 of the receiving side is able to display an image corresponding to the requested usage scene, by performing a second image process in response to a request received from the TV conference device 101-1.

Referring back to FIG. 3, the description of the functional configuration of the TV conference system 100 is continued. The receiving units 305, 306 are for receiving data and information such as images of the conference and usage scene information, sent from the TV conference device 101 of a communication destination via the server device 102. The receiving units 305, 306 include, for example, the communication I/F unit 204 of FIG. 2 and a control program thereof.

The second image processing unit 307 is for performing an image process (second image process) on the image received by the receiving unit 306. The second image processing unit 307 performs an image process on a received image in response to a request from, for example, the TV conference device 101-1 that is a communication destination. Note that the second image processing unit 307 is realized by, for example, programs executed by the CPU 201 of FIG. 2.

The display unit 308 is for displaying images of the conference that have undergone an image process by the second image processing unit 307, and includes, for example, the display unit 208 of FIG. 2 and a control program thereof.

The display control unit 309 displays a plurality of the above-described usage scenes defined in advance on the display unit 308 so as to be selectable, according to an operation by the user, for example. Furthermore, the display control unit 309 sends the usage scene information corresponding to the usage scene selected by the user, to the TV conference device 101-1 that is the communication destination, via the sending unit 310 and the server device 102. The display control unit 309 is realized by, for example, programs operating in the CPU 201.

The sending unit 310 is for sending images of the conference and usage scene information to the TV conference device 101-1 via the server device 102. The sending unit 310 includes, for example, the communication I/F unit 204 of FIG. 2 and a control program thereof.

By the above configuration, the TV conference device 101-1 of the sending side performs an image process (first image process) by the first image processing unit on an image taken by the imaging unit 301, and sends the processed image to the TV conference device 101-2 that is the communication destination, via the server device 102. Furthermore, when usage scene information is received from the TV conference device 101-2 that is the communication destination, the TV conference device 101-1 changes the process contents of the image process by the first image processing unit (for example, the brightness setting of the image) according to the received usage scene information.

Furthermore, the TV conference device 101-2 of the receiving side displays, on the display unit 308, an image received from the TV conference device 101-1 that is the communication destination via the server device 102. Furthermore, in response to a request from the TV conference device 101-1 that is the communication destination, the TV conference device 101-2 performs an image process (second image process) by the second image processing unit on the received image of the conference. Furthermore, the display control unit 309 of the TV conference device 101-2 displays a plurality of usage scenes defined in advance on the display unit 308 so as to be selectable, and sends the usage scene information of the usage scene selected by the user, to the TV conference device 101-1 by using the sending unit 310.

Accordingly, in the TV conference system 100, the user of the TV conference device 101-2 of the receiving side is able to specify the usage scene according to the usage environment of the conference room in which the conference is held and the usage mode. Furthermore, the TV conference device 101-1 is able to change the process contents of the image process to be performed on the image of the conference to be sent, according to the specified usage scene. That is to say, in the TV conference system 100, it is possible to easily perform an appropriate image process, such as brightness adjustment, on the taken image of the conference, according to communication destinations of different usage scenes.

(Functional Configuration of TV Conference Device)

Figure 4:
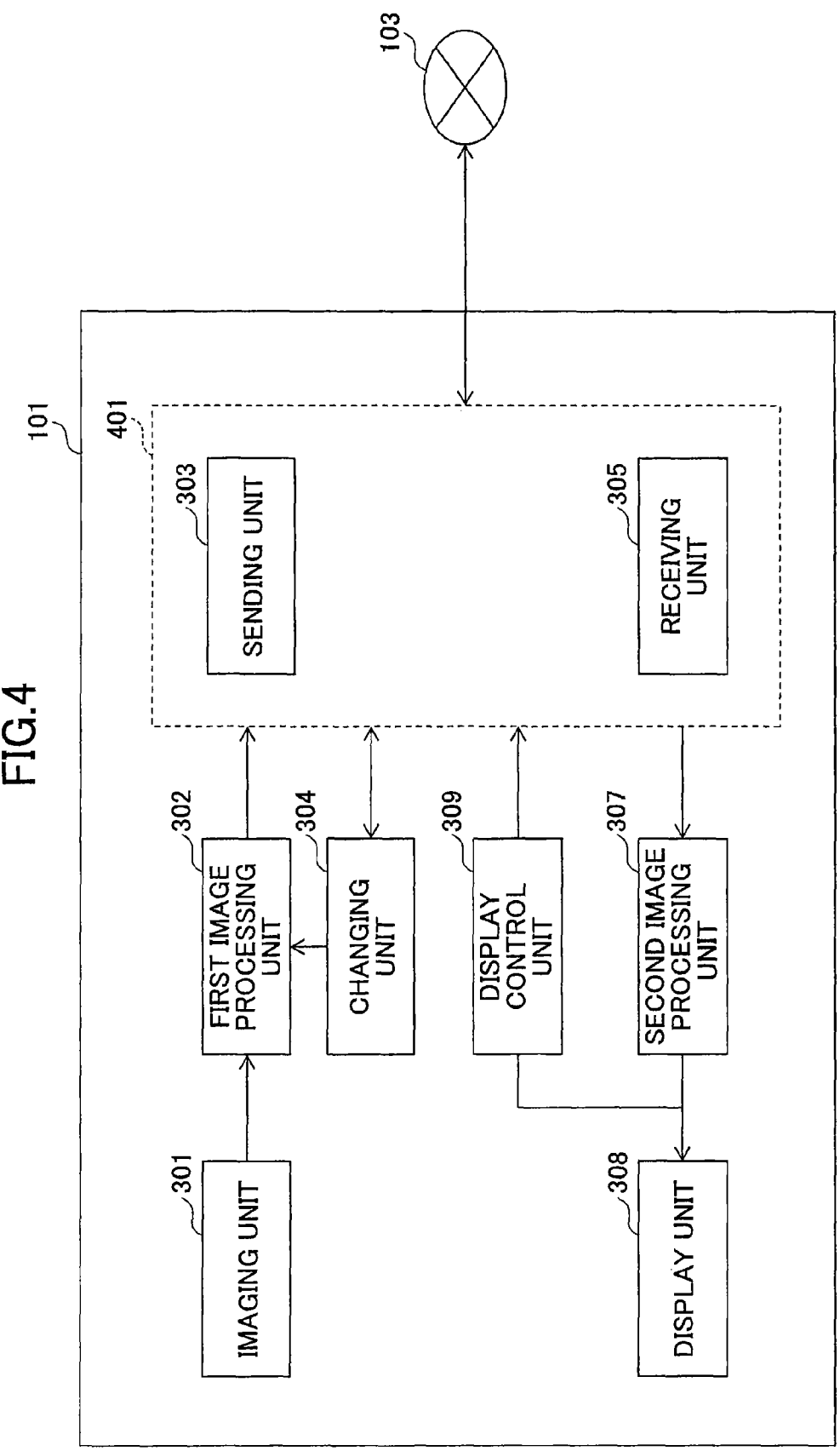
FIG. 4 is a functional configuration diagram of the TV conference device according to an embodiment.

FIG. 4 is a functional configuration diagram of the TV conference device according to an embodiment. In the TV conference system 100, generally, conference images are transmitted and received in a bidirectional manner. Therefore, as illustrated in FIG. 4, the TV conference device 101 preferably includes the elements of the sending side and the receiving side of FIG. 3.

In FIG. 4, the TV conference device 101 includes the imaging unit 301, the first image processing unit 302, the sending unit 303, the changing unit 304, the receiving unit 305, the second image processing unit 307, the display unit 308, and the display control unit 309, described above.

Note that the sending unit 303 and the receiving unit 305 need not be separately provided; as illustrated in FIG. 4, the sending unit 303 and the receiving unit 305 may be provided as a single communication unit 401. Furthermore, the first image processing unit 302 and the second image processing unit 307 may be a single image processing unit for performing the first and second image processes.

As the TV conference device 101-1 and the TV conference device 101-2 have the configuration as illustrated in FIG. 4, it is possible to transmit and receive images of the conference in a bidirectional manner, and to perform an appropriate image process on the image to be sent according to the usage scene.

<Usage Scene Selection Screen>

Here, a description is given of a usage scene selection screen according to an embodiment displayed by the display control unit 309.

Figure 5:
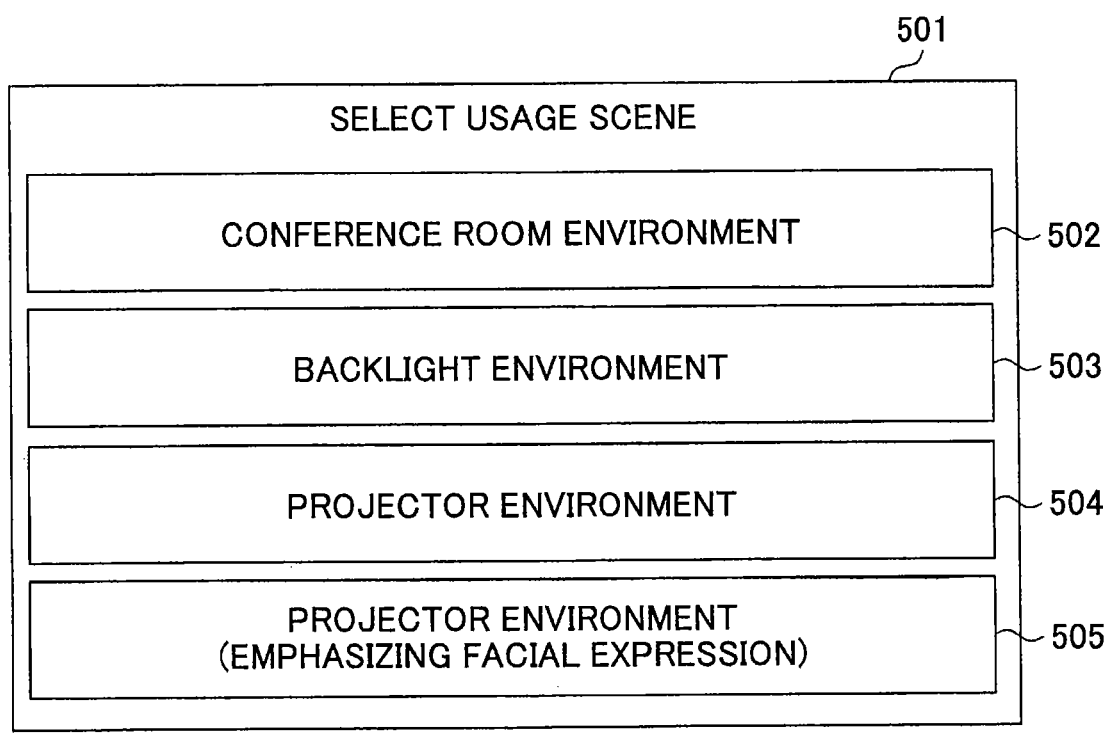
FIG. 5 illustrates an example of a usage scene selection screen according to an embodiment.

FIG. 5 illustrates an example of a usage scene selection screen according to an embodiment. In the example of FIG. 5, the display control unit 309 displays, on a display screen 501 as a usage scene selection screen, the usage scenes of a conference room environment 502, a backlight environment 503, a projector environment 504, and a projector environment (emphasizing facial expression) 505, in a selectable manner.

When the conference room environment 502 is selected from the usage scene selection screen displayed on the display screen 501, an image process (for example, adjusting the brightness of the image) is performed to obtain an optimum image for the environment of a regular conference room.

When the backlight environment 503 is selected, an image process (for example, adjusting the brightness of the image) is performed such that the facial expression of the participant (speaker) of the communication destination can be easily recognized, even in a backlight environment in which backlight occurs when viewing the displayed image. For example, a process of increasing the brightness of the image, and/or a process of increasing the contrast is performed such that the facial expressions can be easily recognized even in a backlight environment.

When the projector environment 504 is selected, an image process is performed such that an image displayed by a projector can be easily recognized. For example, a process of decreasing the brightness of the image is performed to reduce halation in the projected image.

When the projector environment (emphasizing facial expression) 505 is selected, an image process (for example, adjusting the brightness of the image) is performed, such that the facial expression of the participant of the communication destination can be easily recognized, in an environment where an image is displayed by a projector. For example, a process is performed to increase the brightness of the image, in order to reduce black defects in the image of a participant.

For example, the user of the TV conference device 101 is able to select a usage scene from among the plurality of the above usage scenes, by using the operation unit 209 of FIG. 2, for example, a pointing device such as a mouse or a touch panel. The display control unit 309 sends the usage scene information indicating the selected usage scene to the TV conference device 101 of the communication destination, by the sending unit 303 or the sending unit 310.

Note that the settings of the image processes corresponding to the plurality of the above usage scenes may be stored in advance in, for example, the recording device 203 of the TV conference device 101 at the time of shipment. Alternatively, parameters may be dynamically determined based on the taken image.

Furthermore, in the TV conference system 100, the information of a plurality of usage scenes may be stored in the server device 102, and the TV conference device 101 may acquire the setting information of the usage scene stored in the server device 102 and perform a process relevant to the above usage scene information. Accordingly, it is possible to easily add a new usage scene, and add or update the process contents of an image process.

Note that the plurality of usage scenes indicated in FIG. 5 are merely examples. The plurality of usage scenes may be, for example, options of configurations of display devices such as a projector and a display, or options of modes of the conference such as a meeting mode or a presentation mode. Furthermore, the plurality of usage scenes may be options of usage environments such as a bright conference room, a dark conference room, a large conference room, a small conference room, and outdoors.

Flow of Process

First Embodiment

Figure 6:
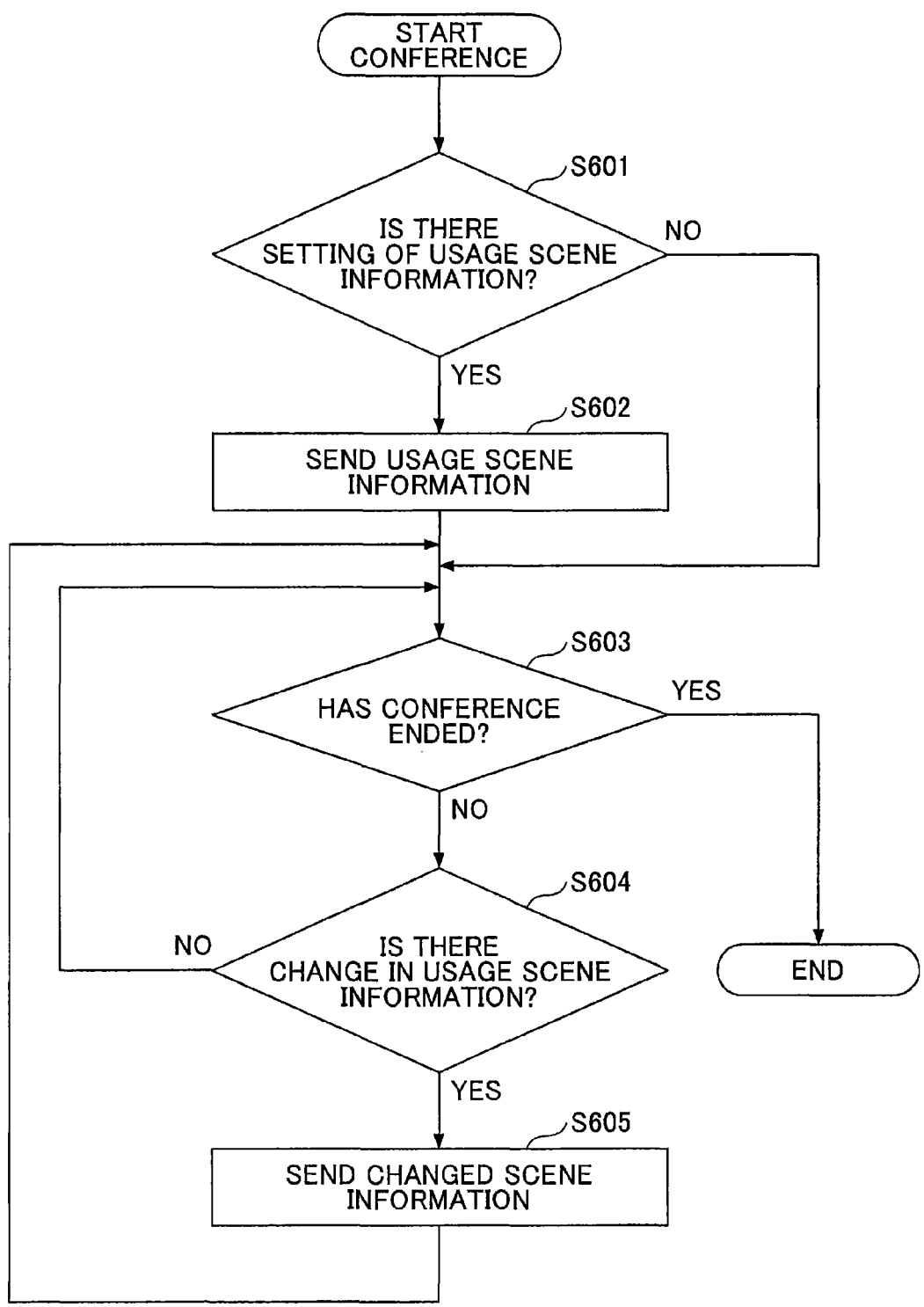
FIG. 6 is a flowchart of a process by the TV conference device (receiving side) according to a first embodiment.

FIG. 6 is a flowchart of a process by the TV conference device (receiving side) according to a first embodiment. In FIG. 6, the TV conference device 101-2 (TV conference device of receiving side) confirms whether usage scene information is set when the conference starts (step S601).

In step S601, when the usage scene information is set, the TV conference device 101-2 sends the set usage scene information to the TV conference device 101-1 that is the communication destination via the server device 102 (step S602). Meanwhile, in step S601, when the usage scene information is not set, the TV conference device 101-2 does not send the usage scene information and proceeds to step S603.

Next, the TV conference device 101-2 determines whether the conference has ended (step S603), and when the conference has not ended, i.e., when the conference is being continued, the TV conference device 101-2 confirms whether the usage scene has changed (step S604). Meanwhile, in step S603, when the conference has ended, the process ends.

In step S604, when there is a change in the usage scene information, the TV conference device 101-2 sends the changed usage scene information to the TV conference device 101-1 that is the communication destination via the server device 102 (step S605). Meanwhile, in step S604, when there are no changes in the usage scene information, the TV conference device 101-2 returns to step S603 and repeats the process of step S603.

By the above process, the TV conference device 101-2 sends, to the TV conference device 101-1 that is the communication destination, the usage scene information set when the TV conference starts or during the TV conference.

Figure 7:
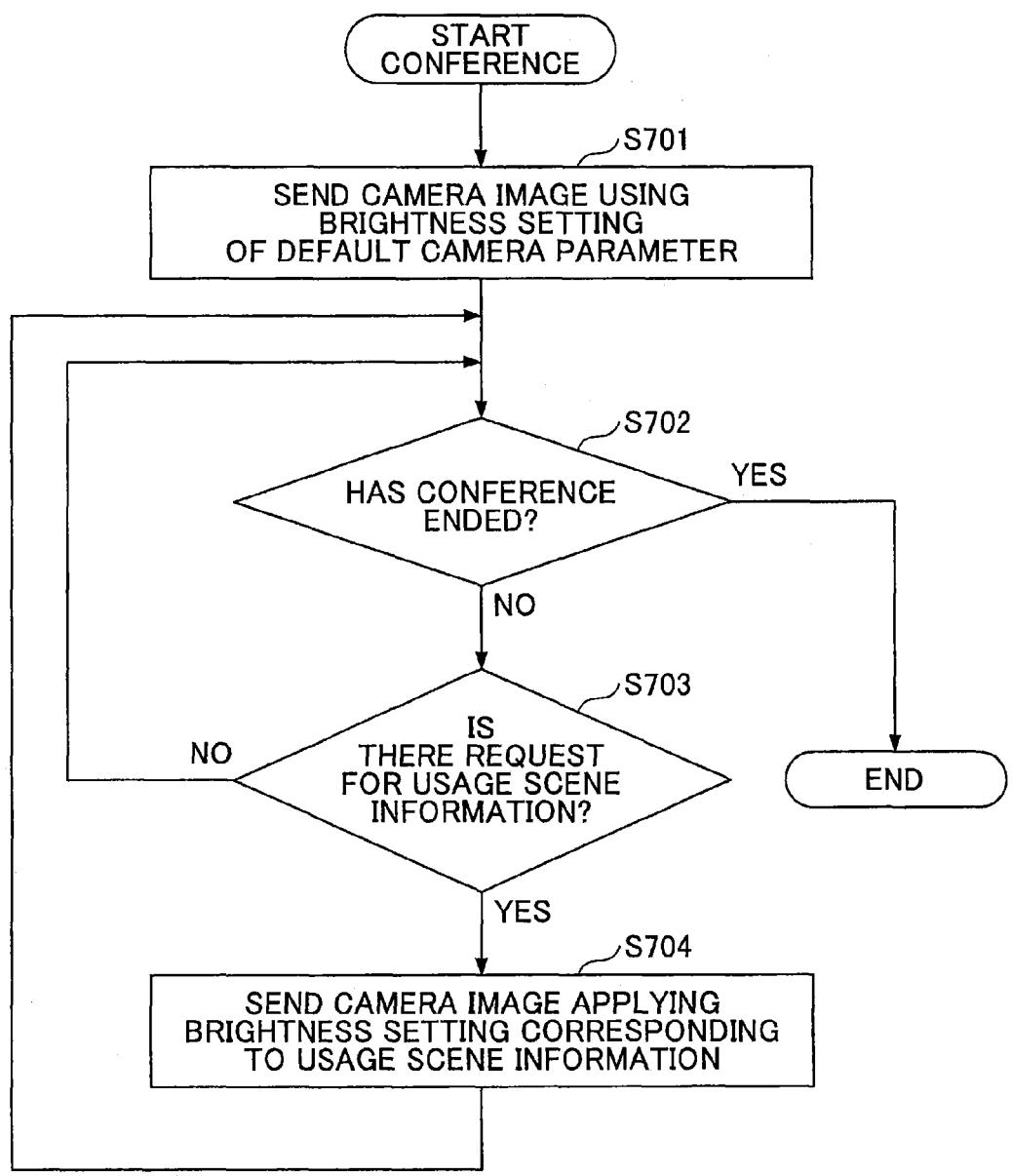
FIG. 7 is a flowchart of a process by the TV conference device (sending side) according to the first embodiment.

FIG. 7 is a flowchart of a process by the TV conference device (sending side) according to the first embodiment. When the conference starts, the TV conference device 101-1 (TV conference device of sending side) sends, to the TV conference device 101-2, an image of the conference taken by using the default camera parameters, or an image of the conference that has undergone a default image process (step S701).

Furthermore, in step S702, the TV conference device 101-1 determines whether the conference has ended, and when the conference has not ended, i.e., when the conference is being continued, the TV conference device 101-1 confirms whether there has been a request for usage scene information (step S703). Meanwhile, in step S702, when the conference has ended, the TV conference device 101-1 ends the process.

In step S703, when there is usage scene information, the TV conference device 101-1 applies an image process corresponding to the usage scene information (for example, changing the brightness setting), and sends the image of the conference to the TV conference device 101-2 that is the communication destination (step S704). Meanwhile, in step S703, when there is no usage scene information, the TV conference device 101-1 returns to step S702 and repeats the process of step S702.

By the above process, the TV conference device 101-1 of the sending side changes the contents of the image process (for example, the brightness setting) to be performed on the taken conference image, based on the usage scene information received from the TV conference device 101-2 of the receiving side.

Second Embodiment

In a second embodiment, a description is given of a process when the TV conference device 101-1 communicates with a plurality of TV conference devices 101-2 through 101-4.

Figure 8:
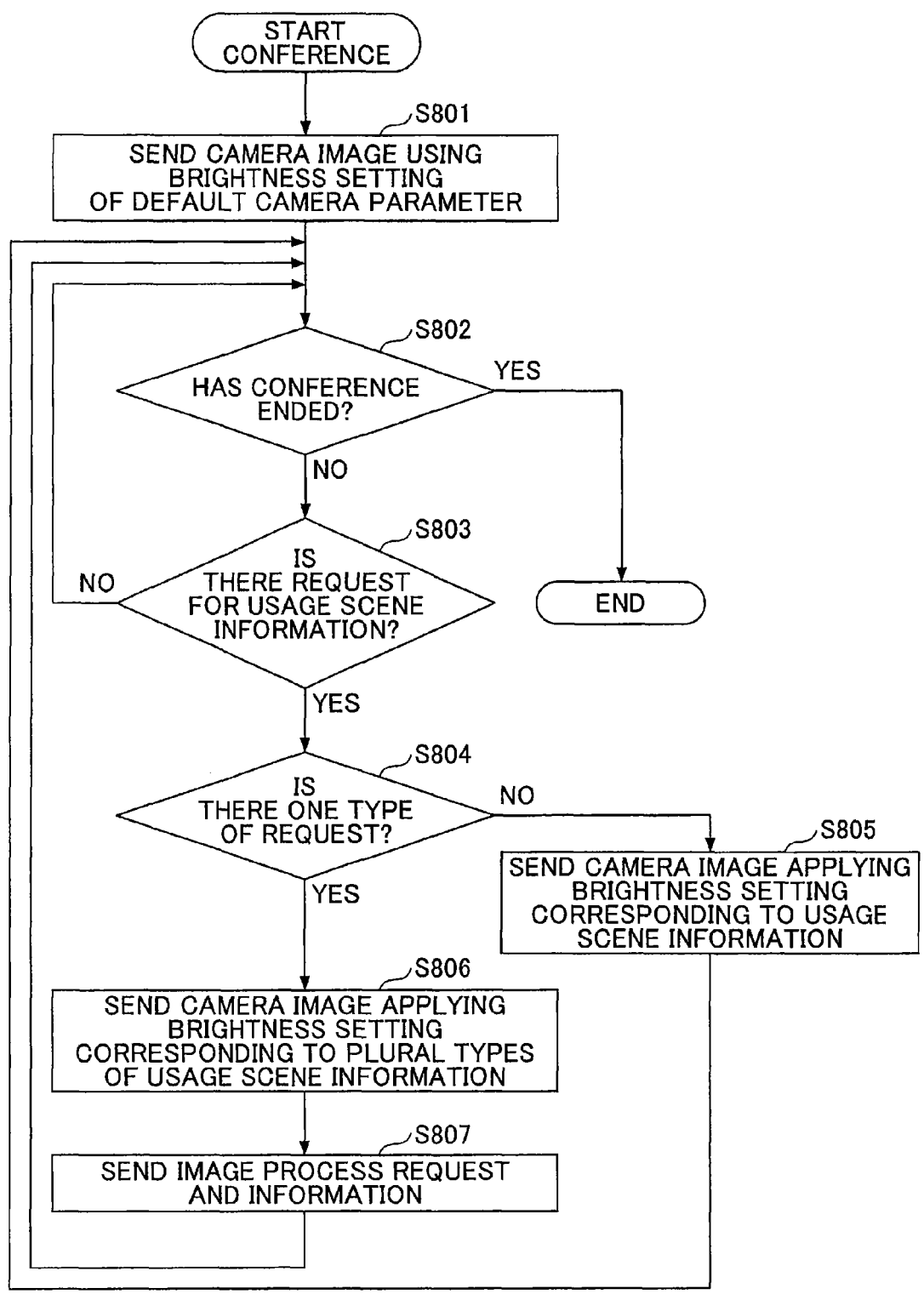
FIG. 8 is a flowchart of a process by the TV conference device (sending side) according to a second embodiment.

FIG. 8 is a flowchart of a process by the TV conference device (sending side) according to the second embodiment. When the conference starts, the TV conference device of sending side, for example, the TV conference device 101-1 of FIG. 1, sends, to the TV conference device that is the communication destination, an image of the conference taken by using the default camera parameters, or an image of the conference that has undergone a default image process (step S801).

Furthermore, in step S802, the TV conference device 101-1 determines whether the conference has ended, and when the conference has not ended, i.e., when the conference is being continued, the TV conference device 101-1 confirms whether there has been a request for usage scene information (step S803). Meanwhile, in step S802, when the conference has ended, the TV conference device 101-1 ends the process.

In step S803, when there is usage scene information, the TV conference device 101-1 determines whether the requested usage scene information is one type (step S804). In step S804, when the requested usage scene information is one type, similar to the first embodiment, the TV conference device 101-1 applies a first image process corresponding to the usage scene information (for example, changing the brightness setting), and sends the image of the conference to the TV conference device that is the communication destination (step S805).

Meanwhile, in step S804, when the usage scene information is not one type, i.e., when there are two or more different types of usage scene information, the TV conference device 101-1 applies a first image process corresponding to the plurality of types of usage scene information (step S806).

For example, it is assumed that brightness correction of +5 is needed according to the usage scene information from the TV conference device 101-2, and that brightness correction of +3 is needed according to the usage scene information from the TV conference device 101-3. In this case, the changing unit 304 of the TV conference device 101-1 changes the process contents of the first image process to include, for example, a brightness correction of +3, as a common process corresponding to the two types of usage scene information.

Next, the TV conference device 101-1 sends the processed image to the TV conference device of the communication destination (step S806).

Furthermore, the TV conference device 101-1 sends a process request for a second image process and process information, to the TV conference device that has sent the usage scene information, based on the requested usage scene information and the process contents of the first image process corresponding to the plurality of the above usage scenes (step S807).

For example, as described above, it is assumed that brightness correction of +5 is needed according to the usage scene information from the TV conference device 101-2, and that brightness correction of +3 is needed according to the usage scene information from the TV conference device 101-3. Furthermore, it is assumed that the first image processing unit 302 has made a brightness correction of +3, as a common process corresponding to the two types of usage scene information. In this case, the changing unit 304 of the TV conference device 101-1 requests the TV conference device 101-2, which has sent the usage scene information indicating that a brightness correction of +5 is needed, to perform a second image process including an additional brightness correction of +2. Meanwhile, for example, the changing unit 304 of the TV conference device 101-1 does not send a second image process request to the TV conference device 101-3, which has sent the usage scene information indicating that a brightness correction of +3 is needed, because brightness correction has already been completed. Alternatively, the changing unit 304 of the TV conference device 101-1 may send a default second image process request to the TV conference device 101-3.

By the above process, the TV conference device 101-1 of the sending side performs a first image process according to a plurality of types of usage scene information, and requests the TV conference device 101-2 that needs an additional image process to perform a second image process.

Figure 9:
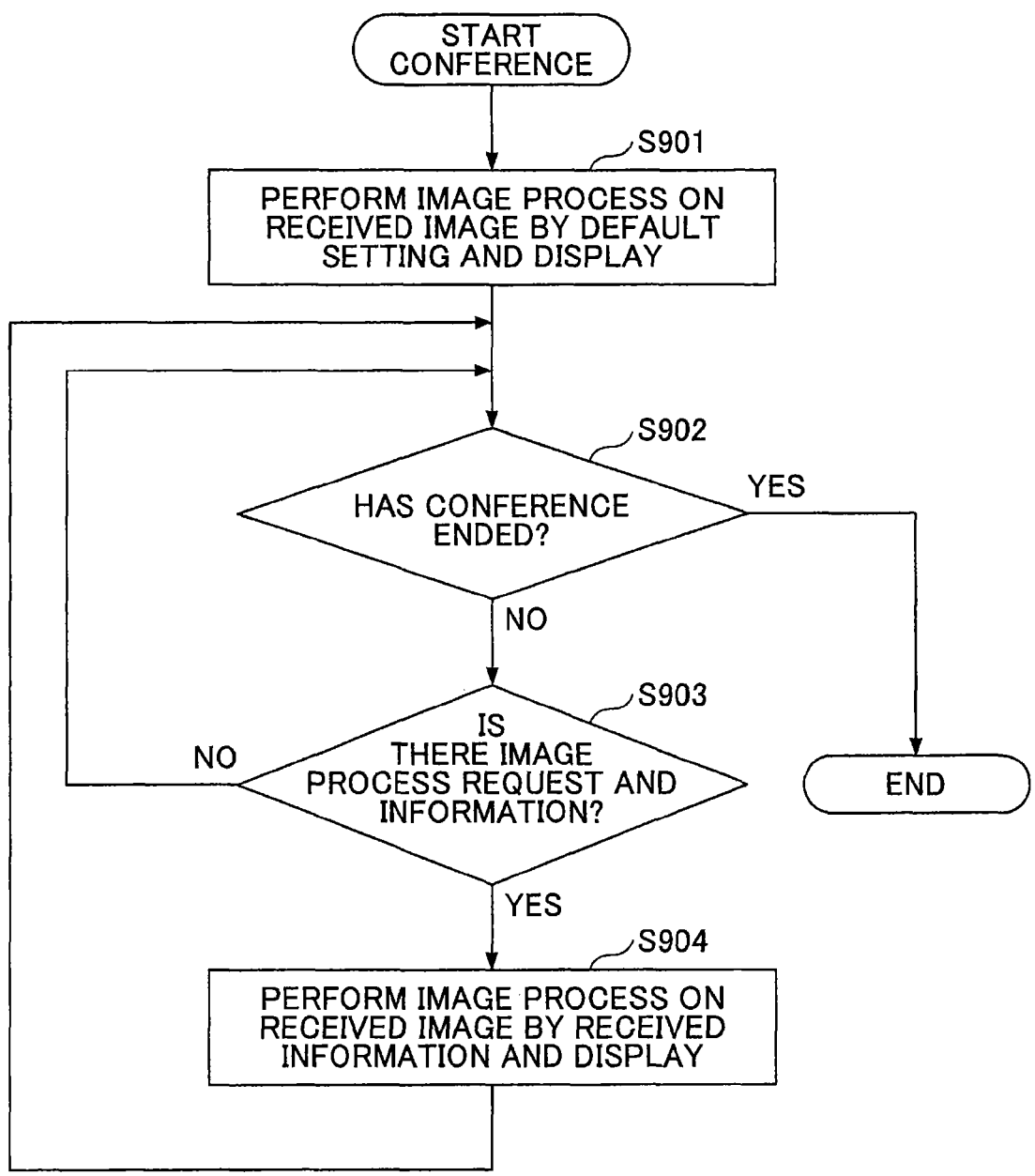
FIG. 9 is a flowchart of a process by the TV conference device (receiving side) according to the second embodiment.

FIG. 9 is a flowchart of a process by the TV conference device (receiving side) according to the second embodiment. The TV conference device of receiving side, for example, the TV conference device 101-2, performs a second image process by the default setting, on a received image of the conference (step S901). Note that at this time, the second image process according to the default setting, may be to pass through the image without performing any particular image process.

Furthermore, in step S902, the TV conference device 101-2 determines whether the conference has ended, and when the conference has not ended, the TV conference device 101-2 determines whether a request for a second image process and information have been received from the TV conference device 101-1 that is the communication destination (step S903). Meanwhile, in step S902, when the conference has ended, the TV conference device 101-2 ends the process.

In step S903, when a request for a second image process and information have been received from the TV conference device 101-1 that is the communication destination, the TV conference device 101-2 performs a second image process on the received image of the conference based on the received information, and displays the image on the display unit 308. Meanwhile, in step S903, when a request for a second image process and information have not been received from the TV conference device 101-1 that is the communication destination, the TV conference device 101-2 returns to step S902 and repeats the process of step S902.

Note that in the above description, the TV conference device 101-1 of the sending side sends information of the second image process together with a request for the second image process, when sending a second image process request to the TV conference device 101-2 of the receiving side; however, this is merely one example. For example, the TV conference device 101-1 of the sending side may only send the request for the second image process. In this case, the TV conference device 101-2 of the receiving side is to have the information such as image processing parameters according to the request for a second image process, stored in advance in the device itself or in the server device 102.

By the above process, the TV conference system 100 is able to perform an appropriate image process on the taken image of the conference, with respect to a plurality of communication destinations having different usage scenes.

Third Embodiment

The image processing function corresponding to the first image processing unit 302 according to the first embodiment may be included in the server device 102. In a third embodiment, a description is given of an example where the server device 102 include an image processing function. Note that the basic configuration and processes are the same as those of the first embodiment, and therefore a description is mainly given of the differences between the first embodiment and the third embodiment.

<Hardware Configuration>

Figure 10:
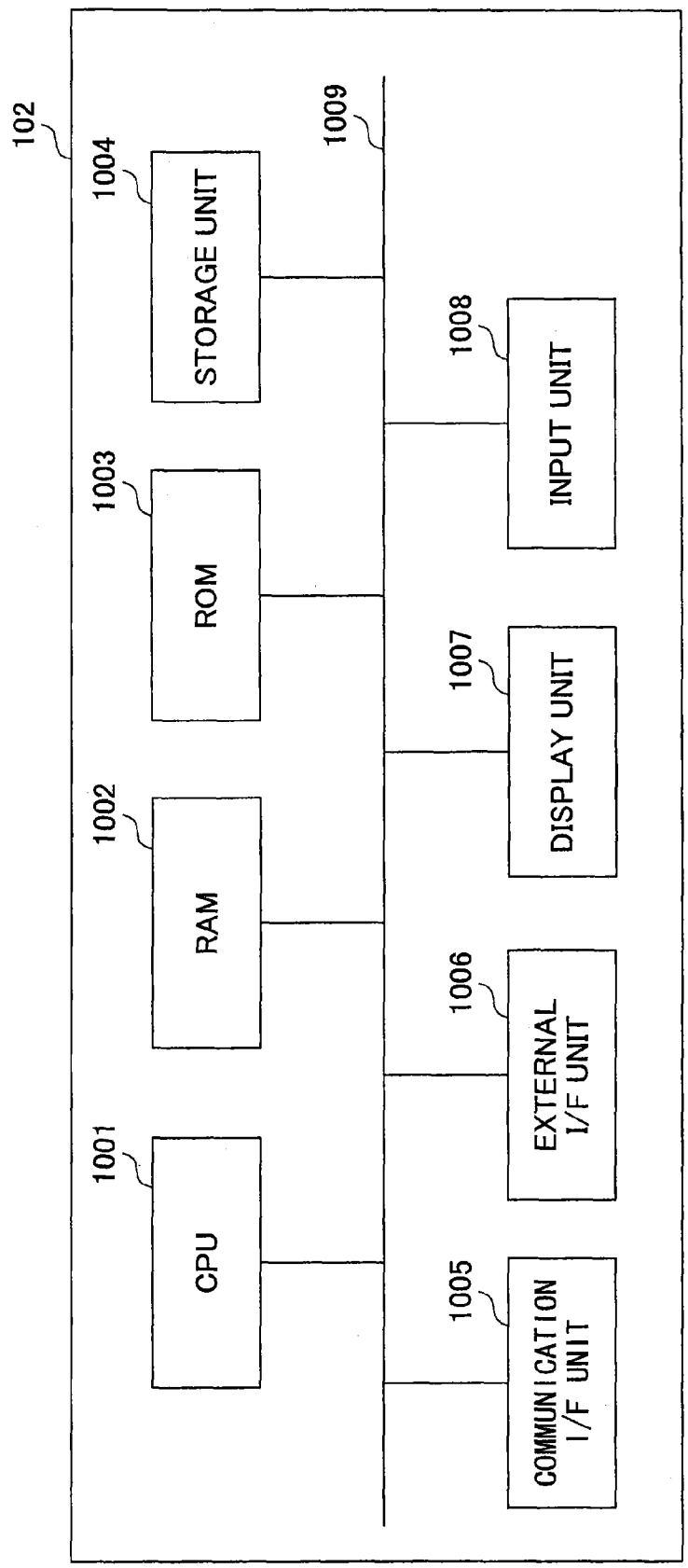
FIG. 10 illustrates a hardware configuration example of a server device according to a third embodiment.

FIG. 10 illustrates a hardware configuration example of the server device 102 according to a third embodiment. The server device 102 has a configuration of a typical computer, and includes, for example, a CPU 1001, a RAM 1002, a ROM 1003, a storage unit 1004, a communication I/F 1005, an external I/F 1006, a display unit 1007, an input unit 1008, and a bus 1009.

The CPU 1001 is a processor for realizing various functions of the server device 102, by loading programs and data from the ROM 1003 and the storage unit 1004 into the RAM 1002 and executing processes. The RAM 1002 is a volatile memory used as a work area of the CPU 1001. The ROM 1003 is a non-volatile memory storing, for example, a BIOS (Basic Input/Output System) executed when the server device 102 is activated, and various settings, and is constituted by, for example, a flash ROM.

The storage unit 1004 is a non-volatile storage device storing, for example, an OS (Operating System), application programs and various data, and is constituted by, for example, a HDD or a SDD.

The communication I/F 1005 is a communication interface for connecting the server device 102 to the network 103, and for performing data communication with a plurality of TV conference devices 101-1 through 101-4.

The external I/F 1006 is an interface for connecting an external device. Examples of an external device are a USB (Universal Serial Bus) memory, a memory card, a recording medium such as an optical disk, and various electronic devices.

The display unit 1007 is, for example, a display device such as a LCD display, for displaying processing results of the server device 102. The input unit 1008 is, for example, an input device such as a keyboard, a mouse, and a touch panel, for receiving user operations for input to the server device 102. Note that the display unit 1007 and the input unit 1008 may be, for example, a display input unit such as a touch panel display, in which a display device and an input device are integrated. The bus 1009 is connected to the above elements, and transmits address signals, data signals, and various control signals.

Note that the above configuration of the server device 102 is merely one example. For example, the server device 102 may further include an image processing processor and a DSP for executing or supporting the image processes.

<Functional Configuration>

Figure 11:
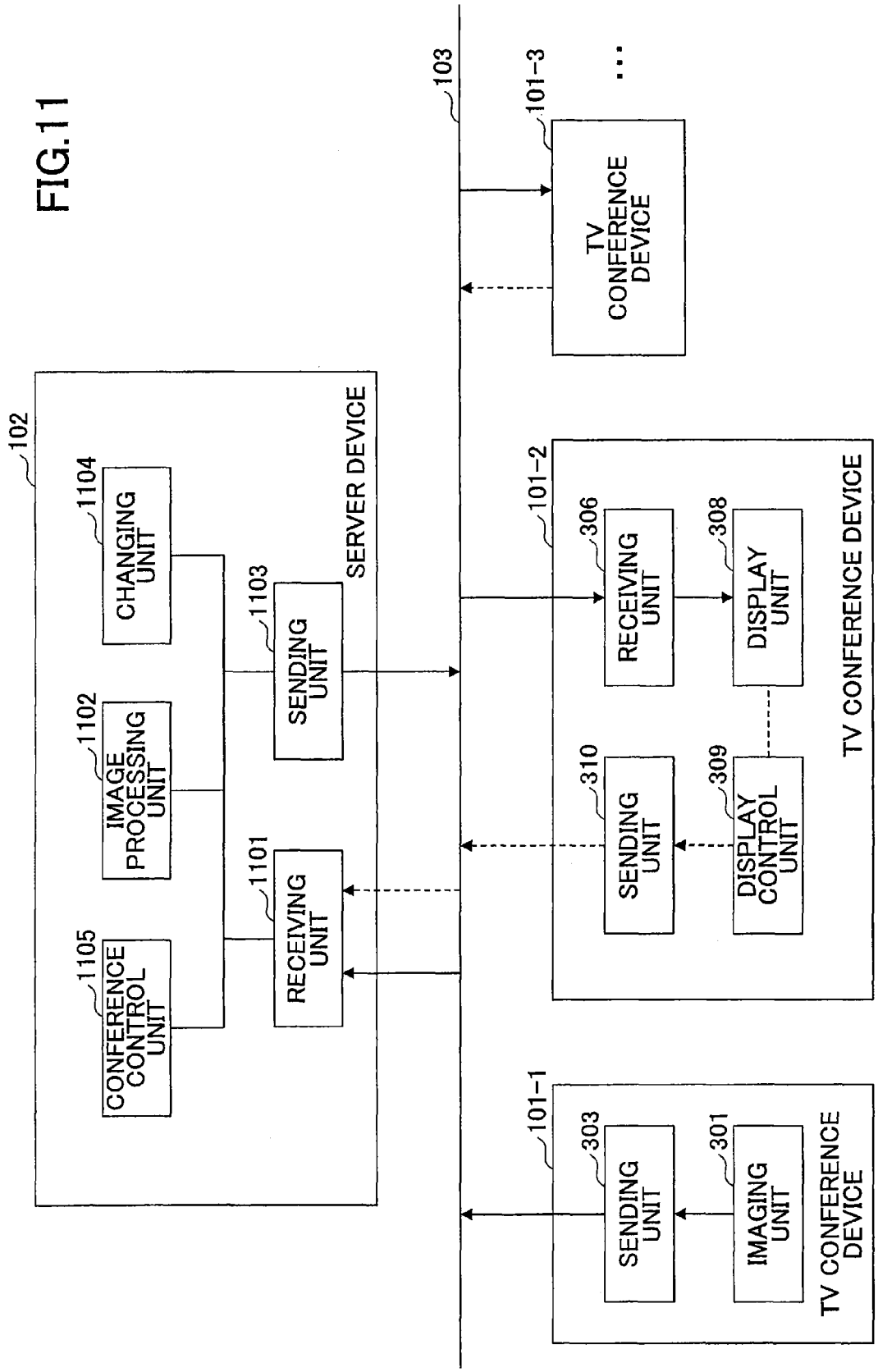
FIG. 11 is a functional configuration diagram of the TV conference system according to the third embodiment.

FIG. 11 is a functional configuration diagram of the TV conference system 100 according to the third embodiment. The TV conference system 100 includes the TV conference devices 101-1 through 101-3 and the server device 102 connected to the network 103.

In the example of FIG. 11, as a matter of simplification, a description is given of a case of distributing the images of the conference taken by the TV conference device 101-1 of the sending side, to the TV conference devices 101-2, 101-3 of the receiving side, via the server device 102.

Note that in FIG. 11, the arrows of solid lines indicate the flow of image data sent from the TV conference device 101-1 of the sending side, and the arrows of dashed lines indicate the flow of usage scene information sent from the TV conference devices 101-2, 101-3 of the receiving side.

(Functional Configuration of TV Conference Device of Sending Side)

The TV conference device 101-1 of the sending side includes, at least an imaging unit 301 for taking images of the conference, and a sending unit 303 for sending the images taken by the imaging unit 301 to the server device 102. Note that the configurations of the imaging unit 301 and the sending unit 303 may be the same as those of the first embodiment.

By the above configuration, the TV conference device 101-1 takes an image of the conference by a predetermined setting (for example, a default brightness setting) by the imaging unit 301, and sends the taken image to the server device 102. Note that the configuration of the TV conference device 101-1 illustrated in FIG. 11 is merely one example. For example, the TV conference device 101-1 may include the first image processing unit 302 similar to the first embodiment, perform a predetermined image process (for example, a default image process) on an image taken by the imaging unit 301, and send the image that has undergone the image process to the server device 102.

(Functional Configuration of Server Device)

The server device 102 includes a receiving unit 1101, an image processing unit 1102, a sending unit 1103, a changing unit 1104, and a conference control unit 1105.

The receiving unit 1101 receives an image sent from the TV conference device 101-1 of the sending side. For example, the receiving unit 1101 receives a first image based on an image taken by the imaging unit 301, including an image taken by the imaging unit 301, and an image obtained by performing an image process on the image taken by the imaging unit 301. Furthermore, the receiving unit 1101 also receives usage scene information sent from the TV conference device 101-2 of the receiving side. The receiving unit 1101 is realized by, for example, the communication I/F 1005 of FIG. 10.

The image processing unit 1102 performs an image process on the first image received by the receiving unit 1101. For example, the image processing unit 1102 is able to execute different image processes for the plurality of the respective TV conference devices of the receiving side, such as performing a first image process on an image to be distributed to the TV conference device 101-2, and performing a second image process on an image to be distributed to the TV conference device 101-3. The image processing unit 1102 is realized by, for example, programs operating in the CPU 1001 of FIG. 10.

The sending unit 1103 sends the image that has undergone an image process by the image processing unit 1102, to the TV conference devices 101-2, 101-3 of the receiving side. For example, the sending unit 1103 sends, to the TV conference device 101-2, an image (second image) that has undergone a first image process by the image processing unit 1102. Furthermore, the sending unit 1103 sends, to the TV conference device 101-3, an image (third image) that has undergone a second image process by the image processing unit 1102.

The changing unit 1104 changes the process contents of the image process by the image processing unit 1102, when usage scene information is received from the TV conference devices 101-2, 101-3 of the receiving side. For example, when usage scene information is received from the TV conference device 101-2 that has distributed the image that has undergone the first image process by the image processing unit 1102, the changing unit 1104 changes the process contents of the first image process according to the received usage scene information. Furthermore, when usage scene information is received from the TV conference device 101-3 that has distributed the image that has undergone the second image process by the image processing unit 1102, the changing unit 1104 changes the process contents of the second image process according to the received usage scene information.

The conference control unit 1105 controls the TV conference by the plurality of TV conference devices 101-1 through 101-3. For example, the conference control unit 1105 monitors the connection state as to whether connection is made with the TV conference devices 101-1 through 101-3, implements connection control when starting/ending a TV conference, and implements control of transmitting and receiving data such as images and voice sound during the TV conference.

(Functional Configuration of TV Conference Device of Receiving Side)

The TV conference device 101-2 of the receiving side includes a receiving unit 306, a display unit 308, a display control unit 309, and a sending unit 310. Note that it is assumed that the TV conference device 101-3 has the same configuration as that of the TV conference device 101-2.

The receiving unit 306 receives an image sent from the server device 102, such as an image of the conference that has undergone an image process by the image processing unit 1102. The display unit 308 displays images of the conference received by the receiving unit 306. The display control unit 309 displays a plurality of usage scenes defined in advance on the display unit 308 so as to be selectable, according to an operation by the user, for example. Furthermore, the display control unit 309 sends the usage scene information corresponding to the usage scene selected by the user, to the server device 102 via the sending unit 310. The sending unit 310 sends the usage scene information received from the display control unit 309 to the server device 102.

Note that the configurations of the receiving unit 306, the display unit 308, the display control unit 309, and the sending unit 310 may be the same as those of the first embodiment.

<Flow of Process>

Figure 12:
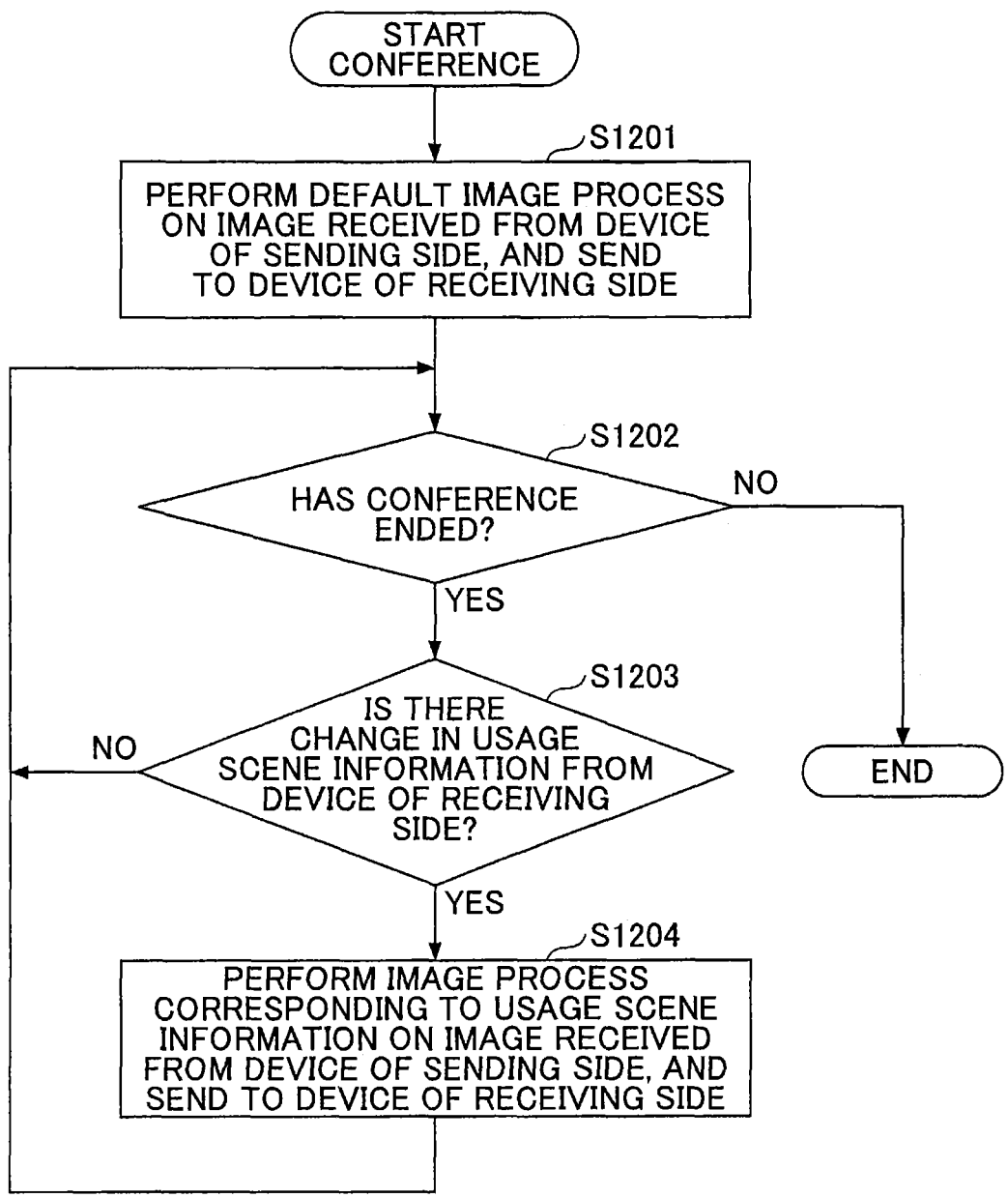
FIG. 12 is a flowchart of a process by the server device according to the third embodiment.

FIG. 12 is a flowchart of a process by the server device 102 according to the third embodiment. When the conference starts, the server device 102 performs a default image process on an image received from a device of the sending side (for example, the TV conference device 101-1), and sends the image to a device of the receiving side (for example, the TV conference device 101-2) (step S1201).

In step S1202, the server device 102 determines whether the conference has ended. In step S1202, when the conference has ended, the server device 102 ends the process. Meanwhile, in step S1202, when the conference has not ended, the server device 102 proceeds to step S1203, and determines whether a change has been made in the usage scene information by the device of the receiving side.

In step S1203, when a change has been made in the usage scene information by the device of the receiving side, the server device 102 proceeds to step S104, performs an image process according to the changed usage scene information on the image received from the sending side, and sends the image to the device of the receiving side. Meanwhile, in step S1203, when a change has not been made in the usage scene information by the device of the receiving side, the server device 102 returns to step S1202 and repeats the process of step S1202.

Next, a description is given of an example of a process by the TV conference system 100.

Figure 13:
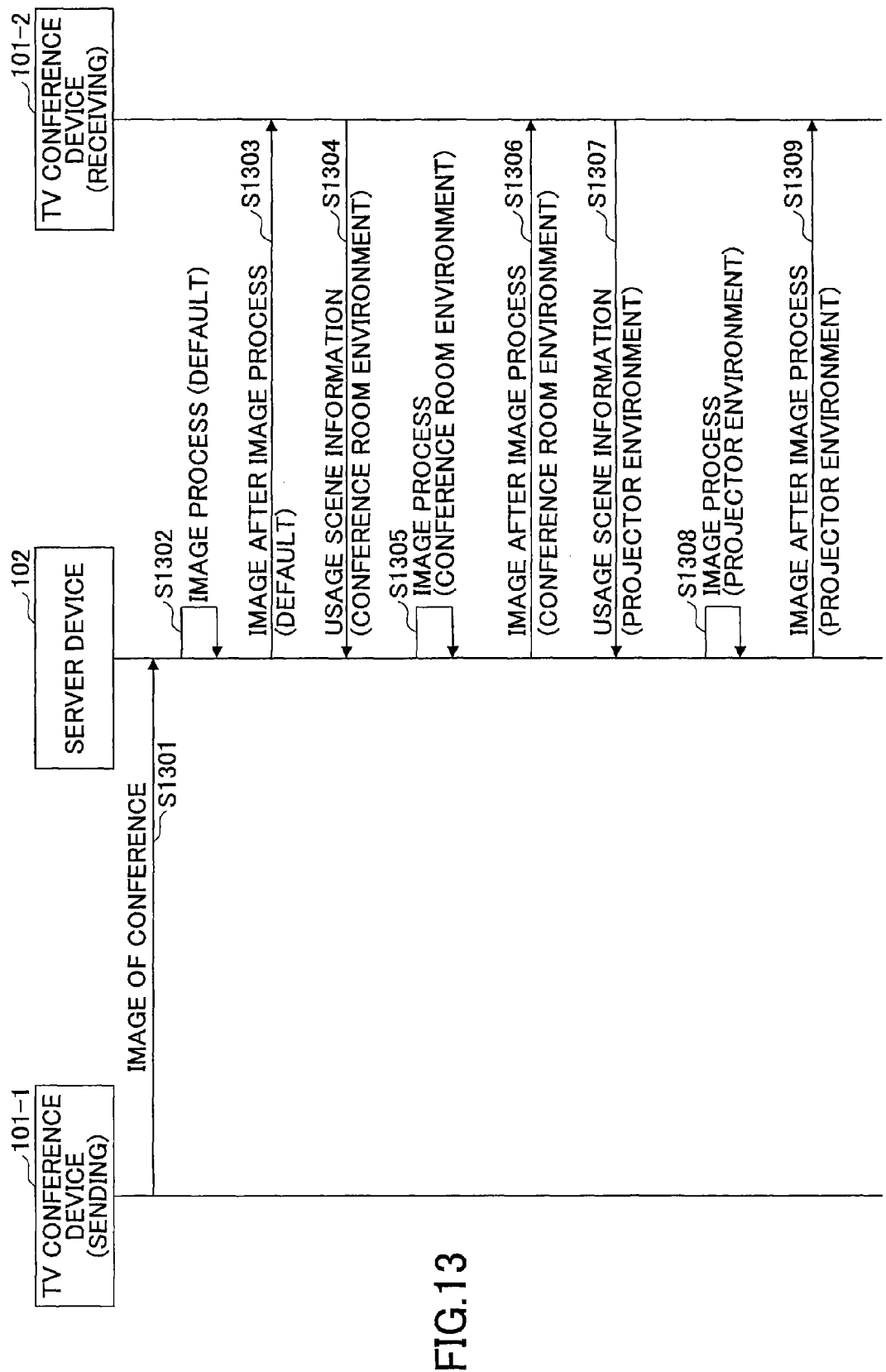
FIG. 13 is a sequence chart of an example of a process by the TV conference system according to the third embodiment.

FIG. 13 is a sequence chart of an example of a process by the TV conference system 100 according to the third embodiment.

In step S1301, the TV conference device 101-1 sends, to the server device 102, an image of a conference based on an image taken by the imaging unit 301, including an image taken by the imaging unit 301, and an image obtained by performing an image process on the image taken by the imaging unit 301. Note that for example, the TV conference device 101-1 continuously sends images of the conference until the TV conference ends.

In step S1302, the image processing unit 1102 of the server device 102 performs an image process by, for example, a default setting on the image of the conference received from the TV conference device 101-1.

In step S1303, the sending unit 1103 of the server device 102 sends, to the TV conference device 101-2 of the receiving side, an image that has undergone an image process of a default setting by the image processing unit 1102. Note that for example, the processes of steps S1302 and S1303 are continuously performed until the conference ends or until usage scene information is received from the TV conference device 101-2.

In step S1304, the TV conference device 101-2 sends, to the server device 102, usage scene information (a change report of a usage scene) specifying a usage scene of "conference room environment", according to an operation by the user.

In step S1305, the changing unit 1104 of the server device 102, which has received usage scene information from the TV conference device 101-2, changes the process contents of the image process by using the image processing unit 1102, according to the received usage scene information (conference room environment). For example, the changing unit 1104 changes the process contents of the image process by using the image processing unit 1102, from "default setting", to "conference room environment", by which an image process (for example, adjusting the brightness of the image) is performed to attain an optimum image for the environment of a general conference room.

In step S1306, the sending unit 1103 of the server device 102 sends, to the TV conference device 101-2 of the receiving side, the image that has undergone an image process of "conference room environment" by the image processing unit 1102. Note that for example, the processes of steps S1305 and S1306 are continuously performed until the conference ends or until another usage scene information is received from the TV conference device 101-2.

In step S1307, the TV conference device 101-2 sends, to the server device 102, usage scene information (a change report of a usage scene) specifying a usage scene of "projector environment", according to an operation by the user.

In step S1308, the changing unit 1104 of the server device 102, which has received usage scene information from the TV conference device 101-2, changes the process contents of the image process by using the image processing unit 1102, according to the received usage scene information (projector environment). For example, the changing unit 1104 changes the process contents of the image process by the image processing unit 1102, from "default setting", to "projector environment", by which an image process is performed such that the image displayed by the projector can be easily recognized.

In step S1309, the sending unit 1103 of the server device 102 sends, to the TV conference device 101-2 of the receiving side, the image that has undergone an image process of "projector environment" by the image processing unit 1102.

As described above, in the TV conference system 100 according to the present embodiment, the server device 102 performs an image process according to the usage scene information received from the TV conference device 101-2 of the receiving side. As the server device 102 performs the image process, it is possible to reduce the load of the TV conference device 101-1 of the sending side and the TV conference device 101-2 of the receiving side.

Next, a description is given of a process when there are a plurality of TV conference devices of the receiving side.

Figure 14:
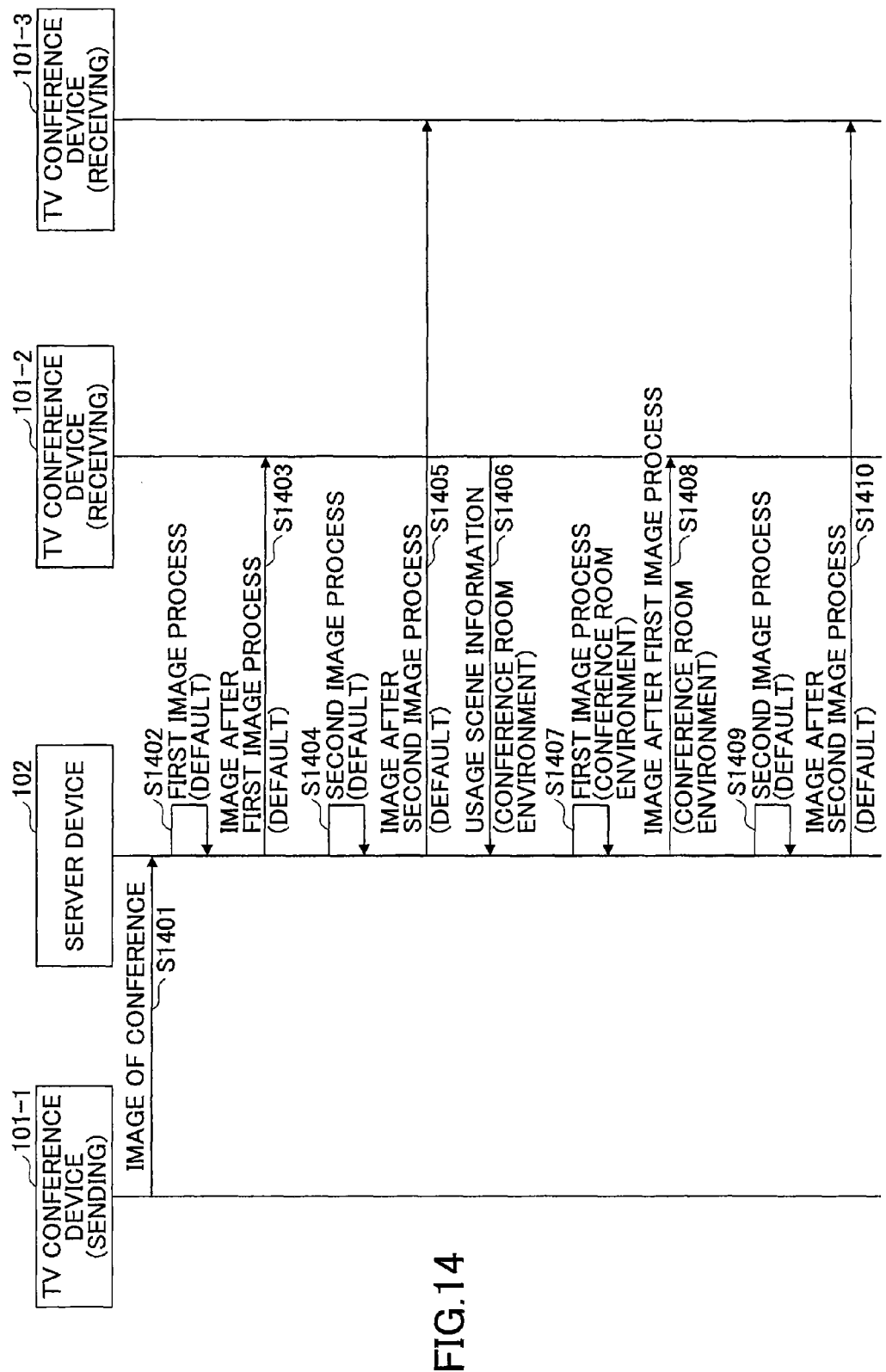
FIG. 14 is a sequence chart of another example of a process by the TV conference system according to the third embodiment.

FIG. 14 is a sequence chart of another example of a process by the TV conference system 100 according to the third embodiment. Note that the basic processes are the same as those of FIG. 13, and therefore a description is mainly given of the differences between FIG. 13 and FIG. 14.

In step S1401, the TV conference device 101-1 sends, to the server device 102, an image of a conference based on an image taken by the imaging unit 301, including an image taken by the imaging unit 301, and an image obtained by performing an image process on the image taken by the imaging unit 301.

In step S1402, the image processing unit 1102 of the server device 102 performs, for example, a first image process by the default setting, on an image (first image) of the conference received from the TV conference device 101-1.

In step S1403, the sending unit 1103 of the server device 102 sends, to the TV conference device 101-2 of the receiving side (first device), an image (second image) that has undergone the first image process by the image processing unit 1102.

In step S1404, the image processing unit 1102 of the server device 102 performs, for example, a second image process by the default setting, on an image (first image) of the conference received from the TV conference device 101-1.

In step S1405, the sending unit 1103 of the server device 102 sends, to the TV conference device 101-3 of the receiving side, an image (third image) that has undergone the second image process by the image processing unit 1102.

In step S1406, the TV conference device 101-2 sends, to the server device 102, usage scene information (a change report of a usage scene) specifying a usage scene of "conference room environment", according to an operation by the user. Accordingly, the changing unit 1104 of the server device 102 changes the process contents of the first image process by the image processing unit 1102 to "conference room environment", according to the received usage scene information.

In step S1407, on the image of the conference received from the TV conference device 101-1, a first image process is performed, by the setting of "conference room environment", by which an image process is performed to attain an optimum image for the environment of a regular conference room.

In step S1408, the sending unit 1103 of the server device 102 sends, to the TV conference device 101-2 of the receiving side, an image that has undergone the first image process by the image processing unit 1102.

In step S1409, the server device 102 has not received usage scene information from the TV conference device 101-3, and therefore the image processing unit 1102 of the server device 102 continues the second image process by default setting, similar to step S1404.

In step S1410, the sending unit 1103 of the server device 102 sends, to the TV conference device 101-3 of the receiving side, the image that has undergone the second image process by the image processing unit 1102.

As described above, the server device 102 according to the present embodiment changes the process contents of the first image process according to the usage scene information received from the TV conference device 101-3. Similarly, when the server device 102 receives usage scene information from the TV conference device 101-2, the server device 102 changes the process contents of the second image process according to the received usage scene information.

Therefore, according to the TV conference system 100 according to the present embodiment, it is possible to easily perform an appropriate image process according to the usage scene, with respect to a plurality of communication devices of different usage scenes.

Note that the configurations of the TV conference system 100 according to the first through third embodiments are merely examples, and the scope of the present invention is not so limited. For example, the display control unit 309 that displays a plurality of usage scenes in a selectable manner, may be included in the server device 102. In this case, for example, the web server provided by the server device 102 is accessed from the TV conference device 101-2 with a web browser, the usage scene selection screen is displayed, and a usage scene is selected.

<Overview>

The TV conference device 101 according to an embodiment of the present invention includes the imaging unit 301 for taking images to be sent to a device of the communication destination, the first image processing unit 302 for performing a first image process on the taken image, and the sending unit 303 for sending the image that has undergone the first image process to a device of the communication destination. Furthermore, when the TV conference device 101 includes the changing unit 304 for changing the process contents of a first image process according to received usage scene information, when usage scene information specifying at least one usage scene from among a plurality of usage scenes defined in advance, is received from a device of the communication destination.

By the above configuration, the TV conference device 101 is able to perform an image process according to the usage scene of a communication destination, on an image of a conference to be sent to the communication destination. That is to say, according to the present embodiment, it is possible to provide the TV conference device (information processing device) 101, by which it is easy to perform an appropriate image process such as adjusting the brightness on a taken image, according to the communication destinations of different usage scenes.

Furthermore, the changing unit 304 requests an image process on an image sent to a device of the communication destination, based on received usage scene information and the process contents of the first image process. Accordingly, it is easy to perform an appropriate image process on a taken image of a conference, even for a plurality of communication destinations of different usage scenes.

According to one embodiment of the present invention, an information processing device and a conference system are provided, by which an appropriate image process such as adjusting a brightness of an image of a conference can be easily performed, according to a usage scene of a device to receive the image of the conference, in a conference system.

The information processing device and the conference system are not limited to the specific embodiments described herein, and variations and modifications may be made without departing from the spirit and scope of the present invention.

The present application is based on and claims the benefit of priority of Japanese Priority Patent Application No. 2014-048966, filed on Mar. 12, 2014, and Japanese Priority Patent Application No. 2014-261638, filed on Dec. 25, 2014, the entire contents of which are hereby incorporated herein by reference.

What is claimed is:

1. An information processing device comprising:
an imaging device configured to take an image;
processing circuitry configured to perform a first image process on the taken image;
a transmission interface configured to send the image, which has undergone the first image process, to a device that is a communication destination, wherein the processing circuitry is configured to change a process content of the first image process, according to usage scene information received from the device that is the communication destination, the usage scene information specifying at least one usage scene among a plurality of usage scenes defined in advance; and
a receiving interface configured to receive an image from the device that is the communication destination,
wherein the processing circuitry is configured to perform a second image process on the received image, and the second image process is performed according to a request from the device that is the communication destination.

2. The information processing device according to claim 1, wherein
the processing circuitry requests the device that is the communication destination to perform an image process on the image to be sent, based on the received usage scene information and the process content of the first image process.

3. The information processing device according to claim 1, wherein
the first image process includes a process for changing a brightness of the taken image.

4. The information processing device according to claim 1, further comprising:
a display device configured to display the image that has undergone the second image process; and
the processing circuitry is configured to control display, on the display device, of the plurality of usage scenes defined in advance in a selectable manner, wherein
usage scene information corresponding to a usage scene that has been selected from among the plurality of the displayed usage scenes, is sent to the device that is the communication destination.

5. The information processing device according to claim 1, wherein
information relevant to the plurality of usage scenes defined in advance, is acquired from a server device connected via a network.

6. A conference system comprising:
an imaging device configured to take an image of a conference;
processing circuitry configured to perform a first image process on a first image based on the taken image; and
a transmission interface configured to send a second image that has undergone the first image process to a first device participating in the conference,
wherein the processing circuitry is configured to change a process content of the first image process, according to usage scene information received from the first device, the usage scene information specifying a first usage scene among a plurality of usage scenes defined in advance,
the processing circuitry further performs a second image process on the first image,
the transmission interface sends a third image that has undergone the second image process, to a second device participating in the conference, and
the processing circuitry changes a process content of the second image process according to usage scene information received from the second device, when the usage scene information, which specifies a second usage scene among the plurality of usage scenes, is received from the second device.

7. The conference system according to claim 6, wherein
at least a portion of the processing circuitry is included in a server device in the conference system.

8. A non-transitory computer-readable recording medium storing a program that causes a computer to execute a process comprising:
- performing a first image process on an image taken by an imaging device configured to take an image;
- sending the image, which has undergone the first image process, to a device that is a communication destination;
- changing a process content of the first image process, according to usage scene information received from the device that is the communication destination, the usage scene information specifying at least one usage scene among a plurality of usage scenes defined in advance,
- receiving an image from the device that is the communication destination; and
- performing a second image process on the received image, and the second image process is performed according to a request from the device that is the communication destination.

* * * * *